United States Patent [19]

Jennings, Jr.

[11] Patent Number: 4,708,206

[45] Date of Patent: Nov. 24, 1987

[54] REMOVING PARTICULATE MATTER FROM A NON-DISSOLUBLE SAND CONTROL PACK

[75] Inventor: Alfred R. Jennings, Jr., Plano, Tex.

[73] Assignee: Mobil Oil Corporation, New York, N.Y.

[21] Appl. No.: 919,120

[22] Filed: Oct. 15, 1986

[51] Int. Cl.[4] ...................... E21B 37/08; E21B 43/04
[52] U.S. Cl. ...................................... 166/281; 166/312
[58] Field of Search ............... 166/281, 276, 278, 307, 166/312

[56] References Cited

U.S. PATENT DOCUMENTS

| 2,663,689 | 12/1953 | Kingston et al. | 166/312 X |
|---|---|---|---|
| 2,768,694 | 10/1956 | Moll et al. | 166/312 X |
| 2,907,390 | 10/1959 | Moll et al. | 166/312 X |
| 3,361,203 | 1/1968 | Rensvold | 166/312 X |
| 3,516,496 | 6/1970 | Barkman, Jr. et al. | 166/281 |
| 3,543,856 | 12/1970 | Knox et al. | 166/281 |
| 3,768,561 | 10/1973 | Tate | 166/281 |
| 4,102,399 | 7/1978 | Harnsberger | 166/276 |
| 4,120,359 | 10/1978 | Harnsberger | 166/278 |
| 4,157,116 | 6/1979 | Coulter | 166/281 X |
| 4,265,311 | 5/1981 | Ely | 166/271 |
| 4,601,339 | 7/1986 | Jennings, Jr. | 166/281 |
| 4,605,061 | 8/1986 | Jennings, Jr. | 166/289 X |

*Primary Examiner*—George A. Suchfield
*Attorney, Agent, or Firm*—Alexander J. McKillop; Michael G. Gilman; Charles A. Malone

[57] ABSTRACT

A process for removing particulate matter from a non-dissoluble sand control pack containing grangulated ceramic material which pack is used to produce hydrocarbonaceous fluid from a subterranean formation. Said pack is contacted with a mineral acid of a strengh and composition sufficient to react with said particulate matter thereby removing said matter and increasing the permeability of said pack without damaging said pack.

10 Claims, 1 Drawing Figure

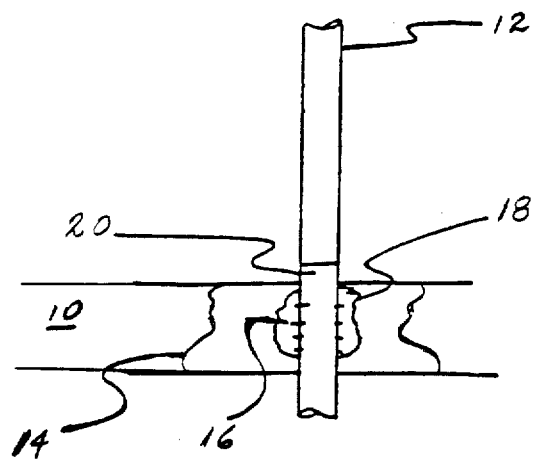

4,708,206

REMOVING PARTICULATE MATTER FROM A NON-DISSOLUBLE SAND CONTROL PACK

FIELD OF THE INVENTION

This invention relates to a process for removing particulate matter from a non-dissoluble sand control pack which contains granulated ceramic material used in the production of hydrocarbonaceous fluids from a subterranean formation.

BACKGROUND OF THE INVENTION

Recovery of formation fluid such as petroleum fluid from a subterranean formation is frequently difficult when the subterranean formation is comprised of one or more incompetent or unconsolidated sand layers or zones. Sand particles in the incompentent or unconsolidated sand zone move or migrate into the wellbore during recovery of formation fluids from that zone or sand particles move away from the well during injection of secondary or tertiary recovery fluids into the formation. When fluids are recovered from the formation, the movement of sand into the wellbore can cause the well to cease production of fluids from said formation. Also, small sand particles can plug small openings in porous masses formed around the wellbore for the purpose of restraining the flow of sand, such as screens or slotted liners which are frequently placed in wells for this purpose. Not only can fluid production be reduced or even stopped altogether, if sand particles flow through the well to the surface, considerable mechanical problems can result from passage of abrasive sand particles through pumps and other mechanical devices.

In order to obtain extended life of sand control packs in hostile environments where hot temperatures and high pressures are encountered, granulated ceramic materials have been utilized for sand pack control purposes. These granulated ceramic sand packs have extended long life periods when utilized in these hostile environments during the production of hydrocarbonaceous fluids from the formation. However, it has been necessary to remove the production stem with the gravel pack attached thereto from the formation in order to clear accumulated particulate matter such as sand and formation fines therefrom. Therefore, what is needed is a method for removing accumulated particulate matter from a non-dissoluble sand control pack in-situ so as to minimize production down time and loss of revenues.

SUMMARY OF THE INVENTION

This invention relates to a method for removing particulate matter from a non-dissoluble sand control pack which contains granulated ceramic material therein which pack is used to produce hydrocarbonaceous fluids from a subterranean formation. Prior to removing said particulate matter, production of hydrocarbonaceous fluid from said formation is ceased. Cessation of production can be accomplished by means known to those skilled in the art. One such method is to utilize a solidifiable gel material to preclude entry of hydrocarbonaceous fluids into the wellbore from the formation. In this manner the formation will not be unduly damaged when the solidified gel material is removed from the formation for resumption of production. After the production of hydrocarbonaceous fluid from said formation has been ceased, said sand control pack is contacted with a solution of a mineral acid of a strength and composition sufficient to react with said particulate matter. Upon reacting with the particulate matter, the acid removes said particulate matter and increases the porosity of said pack without damaging it. Once the particulate matter has been removed from said pack, it can be flushed with a solution sufficient to remove the acid from the wellbore and pack. Afterwards, production of hydrocarbonaceous fluids from the formation into the wellbore is resumed.

It is therefore an object of this invention to remove in-situ, particulate matter from a non-dissoluble sand control pack.

It is a further object of this invention to minimize production downtime when removing a sand control pack from the formation in order to remove particulate matter therefrom.

It is a yet further object of this invention to provide an inexpensive method for the in-situ removal of particulate matter from a sand control pack.

BRIEF DESCRIPTION OF THE DRAWINGS

The drawing is a schematic representation of a well having a non-dissoluble sand control pack therearound within a subterranean formation.

DESCRIPTION OF THE PREFERRED EMBODIMENTS

In the practice of this invention, it is desired to remove particulate matter, e.g. sand and formation fines from a non-dissoluble sand control device. Such sand control devices are disclosed in U.S. Pat. Nos. 4,120,359 and 4,102,399 which issued on Oct. 17, 1978 and July 25, 1978, respectively, to Harnsberger. Said patents are incorporated herein by reference. These devices comprise a means for forming a heat resistant, non-dissoluble pack which resist the high heat eroding and dissolving effects of steam flooding. The pack is formed by a slurry of gravel comprising silicon carbide alone, or with garnet or zircon mixed therewith. The high heat resistant unconsolidated, permeable, non-dissoluble, and long-life sand control pack consists of the granular material silicon carbide alone, or with garnet or zircon mixed therewith for resisting dissolution thereof during a steamflood which minimizes migration of sand and other granular materials into the wellbore from the production zone of a hydrocarbonaceous-bearing formation. After the particulate matter has been removed by processing hydrocarbonaceous fluids therethrough, the sand control pack becomes packed or plugged with said particulate matter. This causes the production of hydrocarbonaceous fluids to be reduced and a loss of pack efficiency for the removal of particulate matter. When this happens, it is necessary to remove the particulate matter from said sand control pack.

Prior to removing said particulate matter, the productive interval of the formation must be "killed". The productive interval of the formation can be "killed" in several ways. One method of "killing" a productive interval of a well is to direct a "kill" fluid down through the wellbore and into the formation. Upon entry of said "kill" fluid into the formation, it causes a "drowning" of the productive interval of the formation. Once the productive interval of the formation has been "drowned", the sand control pack is contacted with a solution of hydrochloric acid of about 5 to about 28 volume % which is used as a preflush. Thereafter, a mixture of hydrochloric acid and hydrofluoric acid is contacted with said sand control pack to restore the pack's permeability. The mixture of hydrochloric and hydrofluoric acid should be in a ratio of about 12 volume % hydrochloric acid to about 3 volume % hydrofluoric acid. Of course, as will be understood by those skilled in the art, the ratio concentration of hydrochloric to hydrofluoric acid will vary depending upon the nature of the particulate matter to be removed from said sand control pack.

In the preferred embodiment as is shown in the drawing, a pumpable solidifiable gel mixture is directed into wellbore 12. Said gel mixture is allowed to flow down wellbore 12 into formation 10 until it comes in contact with the productive interval of formation 10. At the productive interval, said gel mixture enters the productive interval of formation 10 via perforations 16. Sufficient solidifiable gel material is allowed to enter said productive interval thereby closing off said interval to production of hydrocarbonaceous fluids, particularly oil. Additional solidifiable gel material is allowed to enter wellbore 12 which material contacts said productive interval until said gel has filled the wellbore 12 above the productive interval.

When the solidifiable gel material solidifies, it forms a solid gel plug 20 within wellbore 12. It also forms a solid formation gel 14 in the productive interval of formation 10. Gel plug 20 and solid formation gel 14, upon solidification, are of a composition and strength sufficient to withstand the temperatures and pressures encountered in formation 10 so as to exclude hydrocarbonaceous fluids from entering from the formation into wellbore 12.

As is preferred, the solidifiable gel material used in gel plug 20 and solid formation gel 14 should be of a composition sufficient to withstand a temperature range from about 300° F. to about 450° F. for at least about 0.5 of a day to about 4 days. A suitable solidifiable gel mixture can be obtained by mixing into the pumpable gel mixture a chemical known as an oxygen scavenger (such as sodium thiosulfate or short chain alcohols such as methanol, ethanol, and isopropanol), preferably sodium thiosulfate. The concentration of the oxygen scavenger utilized, of course, would depend upon the thermal stability desired to be obtained which varies with the characteristics of a particular formation. However, as is preferred, it is anticipated that the concentration of the oxygen scavenger in the pumpable gel mixture will be from about 0.10 percent by weight to about 0.75 percent by weight, preferably about 0.50 percent by weight. A method for making a suitable solidifiable gel material is disclosed in U.S. Pat. No. 4,605,061 which issued on Aug. 12, 1986 to Jennings, Jr. This patent is hereby incorporated by reference.

As is preferred, it is desired to remove gel plug 20 and formation gel 14 in two different ways. The gel plug as is preferred, can be removed by use of a mineral acid of a strength sufficient to liquify said gel and remove particulate matter from said sand control pack at the same time. Solid formation gel 14 should be composed of a solidifiable gel material containing a gel breaker. This gel breaker, included in the gel mixture, is selected from a group of chemical compounds which can break down a solid gel at temperatures of less than from about 60° F. to about 250° F. Generally this breakdown will occur from about two hours to about 24 hours depending upon the type and concentration of breaker added and thereby remove any remaining solidified gel after contacting said solid gel with said acid, whether said solid gel is the wellbore or the formation. As will be understood by those skilled in the art, the gel mixture should contain a gel breaker of a composition and strength sufficient to withstand the temperatures required in the formation where utilized.

Chemicals satisfactory for use as gel breakers, and which are incorporated into the gel mixture, include enzymes and oxidizing agents, suitable for breaking down the solid gel (such as sodium persulfate). Other gel breakers sufficient for this purpose are discussed in U.S. Pat. No. 4,265,311 which issued to Ely on May 5, 1981. This patent is hereby incorporated by reference. These chemicals are readily available from chemical suppliers and with the exception of enzyme breakers are sold under their chemical names. Enzyme breakers can be obtained from oil field service companies. The concentration of gel breaker incorporated into the gel mixture will vary from about 0.01 weight percent to about 0.10 weight percent, preferably about 0.05 weight percent of the gel mixture. When the solidified gel material has cooled to the desired temperature, the gel breaker will break down the solid gel causing it to liquefy and flow from formation 10.

Sufficient time should be allowed prior to the breakdown of the gel via said gel breakers to allow the solid plug 20 to be removed from the wellbore by use of mineral acids. The mineral acids utilized should be of a strength sufficient to liquefy the solid gel plug as well as to be able to remove particulate matter from the sand control pack 18. For this purpose, the gel plug 20 and sand control pack 18 are contacted with a hydrochloric acid solution of a concentration of from about 5 to about 28 volume percent which is utilized as a pre-flush. Thereafter, the gel plug and pack 18 are contacted with a mixture of hydrochloric and hydrofluoric acid in a concentration of about 12 percent hydrochloric acid to about 3 percent hydrofluoric acid which is sufficient to restore the pack permeability and remove particulate matter from said pack.

By utilization of this method, the particulate matter is removed from said gravel pack 18 without damaging said pack while increasing the permeability of the pack by the removal of said particulate matter. An added benefit of this method is that utilization of the solidifiable gel material enables the production of hydrocarbonaceous fluids to be resumed much earlier than heretofore possible.

In making the solidifiable gel material for utilization in this invention, a slurry is formed with 1,000 gallons of water. This slurry comprises about 40 pounds of base gel such as hydroxypropyl guar gum which forms a hydrate in the water. To this mixture is added about 600 pounds of hydroxypropyl guar gum which has been chemically treated to provide delayed hydration and thickening properties. Approximately 20 pounds of a buffer or catalyst suitable to obtain the desired pH and reaction time is added to said mixture. Cross-linking agents, such as borate and chromates, are then added in an amount of about 20 pounds. After forty to about forth-two pounds of sodium thiosulfate, an oxygen scavenger, is then added to the mixture. This gel mixture is pumped into the formation 10 near the productive interval. After solidification of the mixture and the lapse of the desired suspension time, the solidified gel plug 20 is removed by contacting said plug with hydrochloric acid of a concentration of 3 to about 28 volume percent. The amount of said acid should be sufficient to solubilize the gel composition in wellbore 12 and within said sand control pack 18.

A preferred mixture used to obtain the desired stability and rigidity, for example, is a mixture of hydropropyl guar gum crosslinked with transitional metals and ions thereof. The purpose of the transitional metal ions is to provide increased strength, stability, and rigidity for the subsequently formed solid gel material.

Hydropropyl guar gum is placed into the gel mixture in an amount from about 0.70 to about 10.0 weight percent of said mixture. As preferred, hydropropyl guar gum is placed in said mixture in about 7.2 percent by weight of said mixture.

Metallic ions which can be used in the pumpable gel mixture include titantium, zirconium, chromium, antimony, and aluminum. The concentration of these transitional metals in the pumpable fluid will of course vary depending upon the environmental nature of the wellbore and the formation. Although the exact amount of the metals required will vary depending on the particular application, it is anticipated that the metal should be included within the pumpable gel fluid in amounts of from about 0.005 weight percent to about 0.50 weight percent, preferably about 0.10 weight percent of said fluid.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A process for removing particulate matter from a non-dissoluble sand control pack containing granulated ceramic material which pack is used to produce hydrocarbonaceous fluids from a subterranean formation comprising:
   (a) placing a pumpable solidifiable gel mixture at the productive interval of said formation via a wellbore;
   (b) causing said gel mixture to become a solid thereby forming a gel plug within said wellbore and a formation gel within said productive interval including said non-dissoluble pack sufficient to withstand environment formation conditions and pressures existing therein and cause hydrocarbonaceous fluids to cease flowing into said wellbore from said productive interval; and
   (c) contacting said gel plug, said formation gel, and said pack with a solution of a mineral acid of a strength and composition sufficient to react with said gel plug, said formation gel, and particulate matter thereby solubilizing said gel plug, said formation gel, and removing said particulate matter thereby increasing the permeability of said pack without damaging said pack.

2. The process as recited in claim 1 wherein said acid is hydrochloric acid of a strength from about 5 to about 20 volume percent.

3. The process as recited in claim 1 wherein said acid is a mixture of hydrochloric and hydrofluoric acid wherein said hydrochloric acid is of a strength of about 7.5 to about 12 volume percent and said hydrofluoric acid is of a strength of about 1.5 to about 3.5 volume percent.

4. The process as recited in claim 1 where in step (b) said gel mixture solidifies after from about 2 to about 4 hours.

5. The process as recited in claim 1 where in step (b) said gel mixture becomes solid and is made thermally stable for temperatures of from about 350° F. to about 450° F. for from bout 0.5 of a day to about 4 days.

6. The process as recited in claim 1 where in step (a) a gel breaker is added to the pumpable gel mixture in amounts sufficient to break the solid gel at temperatures at less than from about 60° to about 250° F. within from about 2 hours to about 24 hours and thereby remove any remaining solidified gel after step (c) either in the wellbore or the formation.

7. The process as recited in claim 1 where in step (a) an oxygen scavenger is placed into said gel mixture, and said oxygen scavenger is a material selected from the group consisting of sodium thiosulfate and a short chain alcohol.

8. The process as recited in claim 1 where in step (a) an oxygen scavenger is placed in said gel mixture in a concentration of from about 0.10 percent by weight to about 0.75 percent by weight.

9. The process as recited in claim 1 where in step (a) said gel mixture contains a gel breaker capable of breaking down said solid gel at temperatures less than from about 60° F. to about 250° F. within from about 2 to 24 hours.

10. The process as recited in claim 1 where in step (a) said gel mixture contains a gel breaker capable of breaking down said solid gel where said gel breaker is a material selected from the group consisting of an enzyme and an oxidizing agent.

* * * * *

UNITED STATES PATENT AND TRADEMARK OFFICE
CERTIFICATE OF CORRECTION

PATENT NO. : 4,708,206

DATED : November 24, 1987

INVENTOR(S) : Alfred R. Jennings, Jr.

It is certified that error appears in the above-identified patent and that said Letters Patent is hereby corrected as shown below:

Abstract, line 2, "grangulated" should be --granulated--.

Column 1, line 17, "incompentent" should be --incompetent--.

Column 4, line 59, "forth-two" should be --forty-two--.

Column 5, line 44 (claim 1) "environment" should be --environmental--.

Signed and Sealed this

Twenty-first Day of June, 198

*Attest:*

DONALD J. QUIGG

*Attesting Officer*     *Commissioner of Patents and Trademarks*